United States Patent [19]

Andronica

[11] Patent Number: 5,516,242

[45] Date of Patent: May 14, 1996

[54] CUTTING TOOL AND SHANK

[76] Inventor: Randall Andronica, 1815 Coleman St., Brooklyn, N.Y. 11234

[21] Appl. No.: 217,414

[22] Filed: Mar. 24, 1994

[51] Int. Cl.$^6$ .................................................. B23B 51/00
[52] U.S. Cl. ............................... 408/59; 407/11; 407/48; 407/54; 407/62; 408/227; 408/233; 408/713
[58] Field of Search .................................. 408/57, 59, 200, 408/227, 228, 229, 231, 233, 713; 407/30, 35, 54, 61, 62, 40, 48, 11

[56] References Cited

U.S. PATENT DOCUMENTS

| | | |
|---|---|---|
| 124,089 | 2/1872 | Shepardson . |
| 2,400,856 | 5/1946 | Thompson . |
| 2,621,548 | 12/1952 | Williams ................................. 408/233 |
| 2,971,409 | 2/1961 | Peters et al. . |
| 3,711,217 | 1/1973 | Imelmann et al. . |
| 3,788,182 | 1/1974 | Tyler . |
| 3,827,119 | 8/1974 | Bennett ..................................... 407/40 |
| 3,831,236 | 8/1974 | Coburn et al. . |
| 3,966,350 | 6/1976 | Benjamin . |
| 4,040,764 | 8/1977 | Baturka ..................................... 408/59 |
| 4,047,826 | 9/1977 | Bennett . |
| 4,120,601 | 10/1978 | Benjamin . |
| 4,160,616 | 7/1979 | Winblad . |
| 4,251,172 | 2/1981 | Durand . |
| 4,344,724 | 8/1982 | Kress et al. . |
| 4,423,989 | 1/1984 | Kress et al. . |
| 4,493,596 | 1/1985 | Sunsky et al. ........................... 408/713 |
| 4,566,828 | 1/1986 | Reinauer . |
| 4,726,721 | 2/1988 | Heel et al. .............................. 409/233 |
| 4,770,571 | 9/1988 | Potemkin . |

FOREIGN PATENT DOCUMENTS

| | | | |
|---|---|---|---|
| 2910323 | 10/1980 | Germany ................................. 408/59 |
| 101708 | 4/1992 | Japan ..................................... 408/227 |
| 270610 | 9/1950 | Switzerland ............................. 407/40 |
| 842133 | 7/1960 | United Kingdom .................... 408/227 |

OTHER PUBLICATIONS

Dapra Corporation advertisement, *Manufacturing Engineering*, Apr. 1994.

*Primary Examiner*—Daniel W. Howell
*Attorney, Agent, or Firm*—Hoffmann & Baron

[57] ABSTRACT

A cutting tool particularly adapted for machining brittle plastics in which the cutting head has its cutting edges in the first and fourth quadrants of the x-y axes and contained in a common plane on opposite sides of the axis of tool rotation. The cutting edges are on two planar inserts, which can be either integral or separate elements, which meet at the common plane and each of which is relieved or cut away in the opposite quadrant from its own cutting edge to expose the cutting edges of the other. The walls defining the reliefs have 2 or more non-aligned sections forming different angles with the axis of rotation with the steepest angle beginning at the axis and preferably inwardly of the tip of the tool and, overall, exposing not less than a full quadrant of the cutting edge of the other insert while providing cavities and contours which control the movement of the chips and the flow of coolant fluids. The shank which holds the cutting head includes a fork whose tines embrace the planar inserts and include contouring compatible with the geometry of the reliefs to allow for the flows of chips and coolant, the paths for which are formed in the shank and inserts in complementary fashion.

21 Claims, 10 Drawing Sheets

CUTTING TOOL AND SHANK

BACKGROUND OF THE INVENTION

The invention relates to improvements in cutting tools, and more specifically, to improvements in cutting tools and shanks for machining and drilling plastics of various types, particularly acrylics and polycarbonates, as well as other non-metallics, and non-ferrous sheet metals.

Acrylic plastics are a family of plastics that rival glass in optical transparency. The primary advantage of the material is that it is many times more impact resistant than glass, and, unlike glass, it is readily fabricated with standard metal-working tools and equipment. Despite this, conventional tools leave much to be desired in the quality of work produced. While the material is initially transparent, after any machining operation, the material is left translucent or diffuse. Restoring an optical finish to the part requires progressive polishing operations. Internal surfaces can be extremely difficult or impossible to polish effectively.

Drilling is one of the most difficult operations in this heat-sensitive material, since a large amount of material is removed in a single pass. This generates considerable heat and chips which cannot be effectively dissipated, as the material is a poor thermal conductor and is inaccessible to external cooling. In addition, drill bits will characteristically produce a hole that is smaller than the size of the tool, because of the material's poor thermal conductivity, and its high thermal coefficient of expansion. This makes obtaining a precise size hole difficult, requiring either a special oversize tool, or secondary operation such as boring, or reaming and polishing. Moreover, these tools will produce a "bullet hole" exit upon breaking through the work. Industry's answer to this has been to use an acute drill point and/or to place flats on the cutting lips, to create a scraping action. Nonetheless, considerable care must be exercised, and clean holes are not necessarily assured. On critical work, back-up material is often used to prevent chipping on break-through. This is also a problem with milling cutters and turning tools which chip the work as they traverse off the part. Depth of cut and feed rate must be carefully controlled to avoid this. Furthermore, the aforementioned machining operations, especially drilling, leave residual stress in the workpiece. The stresses left in the material can later lead to crazing (spider-web like cracks) or even failure of the part. To insure against this, parts are annealed, i.e., exposed to elevated temperatures for a considerable period of time and allowed to cool slowly.

The invention described herein, overcomes all the shortcomings of conventional tooling and offers additional advantages.

OBJECTIVES OF THE INVENTION

It is therefore a primary objective of the invention to provide a tool that will leave an optical finish in the material requiring little or no polishing. It is another objective to provide a tool that will produce holes with dimensions that can be held within a few ten-thousandths of an inch of the tool size. Another objective is to provide a cutting tool that will not chip the material as it traverses off the work, and will leave a sharp clean exit hole upon exiting in a drilling operation. It is another objective to produce a tool that is versatile, with a shank stop and interchangeable cutting elements which are precisely located, that can be easily and quickly replaced, so a user can select an insert geometry best suited to the work or replace a dull cutting tool without affecting machine set-up, hole size or depth setting. Still another objective is to (a) provide coolant passages directly into the cutting insert; and (b) provide a shank with through-the-tool coolant capability to lubricate and keep work and tool cool, and to aid in chip removal. It is another objective to provide a tool whose coolant exit passages will not become clogged, with the possible danger of spreading the inserts, should coolant flow cease during the operation. It is yet another objective to produce a tool in which compressed shop air may be used as the cooling medium.

Another objective is to provide a drilling tool capable of penetrating the work in a continuous feed to a depth of up to four times the drill diameter on through holes, or 5 diameters deep on blind holes.

It is another objective to produce an insert that can be easily resharpened or resized to renew the cutting edge or to produce a special size insert/hole.

Another objective is to provide a shank that can accommodate a range of insert sizes.

It is yet another objective to produce a tool that can be economically mass produced.

Another objective is to produce a cutting tool that can accomplish a variety of machining operations including, drilling, milling, reaming, turning, boring, facing, flycutting, and scribing layout lines.

Other objectives and advantages will be seen from the following description of the invention.

BRIEF DESCRIPTION OF THE PRIOR ART

The use of forked shanks for holding removable cutting heads began in the nineteenth century as shown in U.S. Pat. No. 124,089. A large assortment of shank supported cutting head designs have evolved over the years to perform a variety of cutting functions. Precision radial machining, i.e., lateral motion at shallow depths, has been achieved by the disclosure of U.S. Pat. No. 4,251,172 using two cutting portions symmetrically arranged with respect to the shank axis and presenting, in plan view, a section of a circle exceeding a semi-circle. The two cutting portions are each symmetrically relieved at a defined angle along a defined chord to present a point of intersection which is precisely on the axis of shank rotation. A precision radius cut is thereby achieved in the work. The cut is incremental, removing part of the material on initial cutting engagement and thereafter removing progressively more material until the desired depth (not exceeding the full diameter of the circular cutting geometry) is reached. Relative lateral movement between the work and tool achieves a radius cut of any desired length along any desired track. While this design is capable of machining precision radius cuts in brittle plastics, it is incapable of drilling, a more important and more difficult machining function.

Producing precision holes by drilling is one of the most difficult of all machining operations in materials such as acrylic plastics where heat sensitivity is high, hole size becomes erratic, chips are difficult to control, internal stresses survive the machining, and optical finishes are all but unattainable using any known drill design. The prior art lacks any teaching of tool geometry and structure which can carry the radius cutting precision of the prior art to the more difficult art of drilling.

SUMMARY OF INVENTION

The invention consists of paired cutting inserts held in a fork at the end of a rotary shaft or shank. The tool utilizes two identical inserts, face to face, to make up the cutting head. The inserts are accurately and precisely located in the shank by a securing screw. A flat on the insert and on the fork orients the cutting faces. The assembled primary insert is circular in form—although other insert forms and even dissimilar inserts may be used to generate virtually any profile geometry in the work. Since the tool has relief along its periphery, it will cut in any direction. In a tool intended primarily for machining acrylics, the circular tool form is preferred. The tool will produce an optical finish and exit the work without chipping. It achieves this because of the progressive cut inherent in a circular tool and because a radius edge produces finer finishes and because the inserts are made in two halves with a 0° top rake angle which facilitates the production of a very keen edge. Also, in drilling, there are only two cutting surfaces contacting the work which balance the cutting forces and because the cut is finished at the insert diameter, with no further contact taking place with the finished wall. The assembly has provision to deliver any suitable coolant (which may be air or water soluble oil) to carry heat and chips away from the tool and the work. The coolant is administered through the shank to the cutting insert, and an exit channel is provided in the back face of the tool opposite the cutting quadrant, which prevents it from becoming clogged with chips. The cutting inserts may be utilized with at least two shank styles. The head of the shank is forked to receive the inserts which are relieved to facilitate chip removal in drilling. A chordal flute shank aids chip removal and is primarily designed to drill holes having a depth up to 5 times the cutting diameter using continuous power feed. The straight shank permits the use of a variety of insert sizes, is better suited to milling, and adapts the tool to other machines and accessories more readily. The "single point" nature of the tool enables it to turn, bore, face, flycut, and even scribe lines in addition to drilling, reaming, and milling.

DESCRIPTION OF THE PREFERRED EMBODIMENTS

Figure 1:
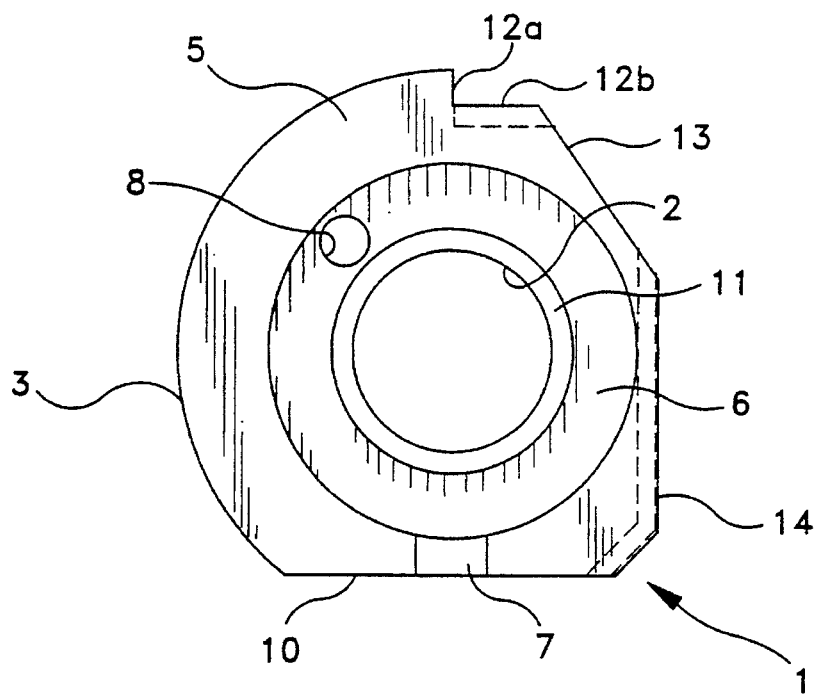
FIG. 1 is an elevation view showing the cutting face side of one preferred embodiment of the cutting insert.
Figure 2:
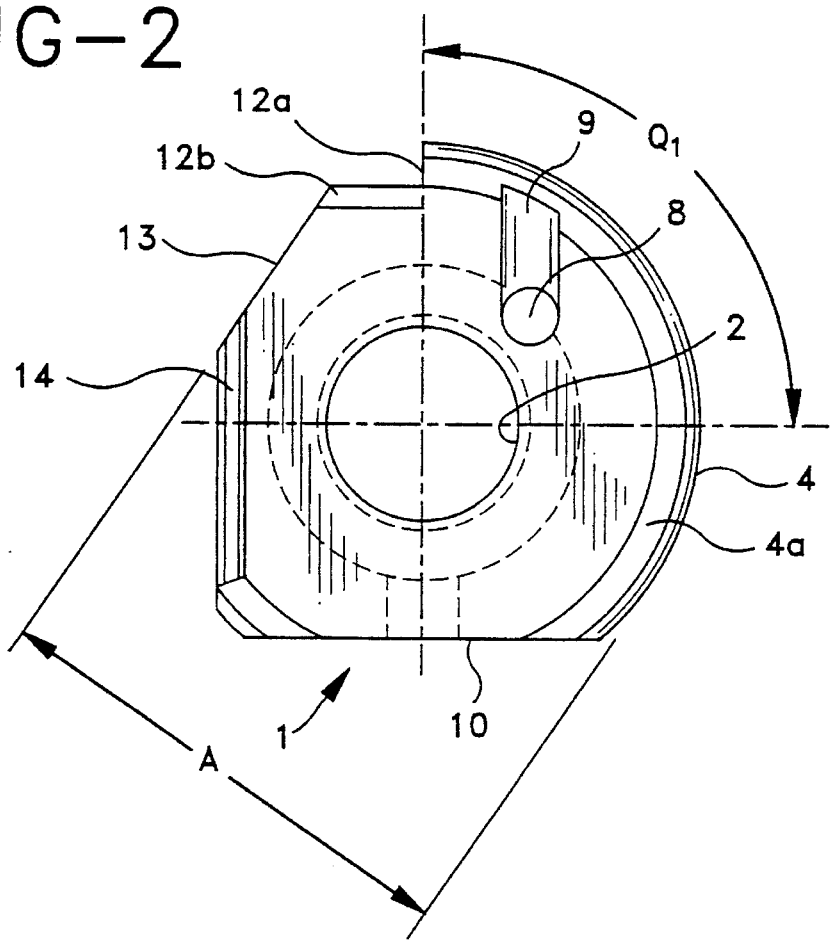
FIG. 2 is an elevation view of the backside of the cutting insert illustrated in FIG. 1.
Figure 3:
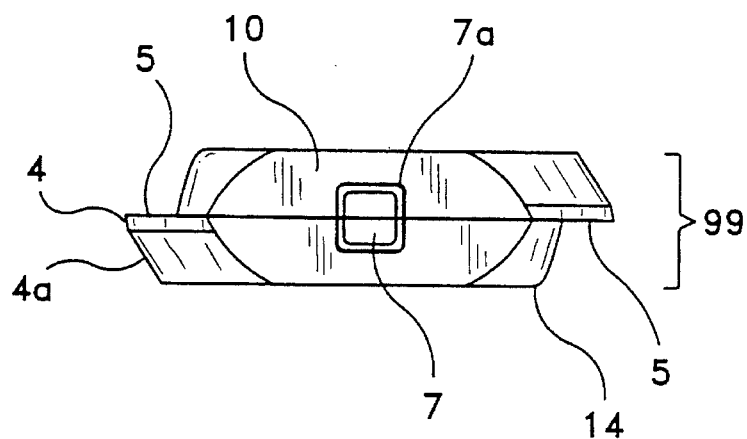
FIG. 3 is an edge view of the back or lower end of a pair of mated cutting inserts.
Figure 4:
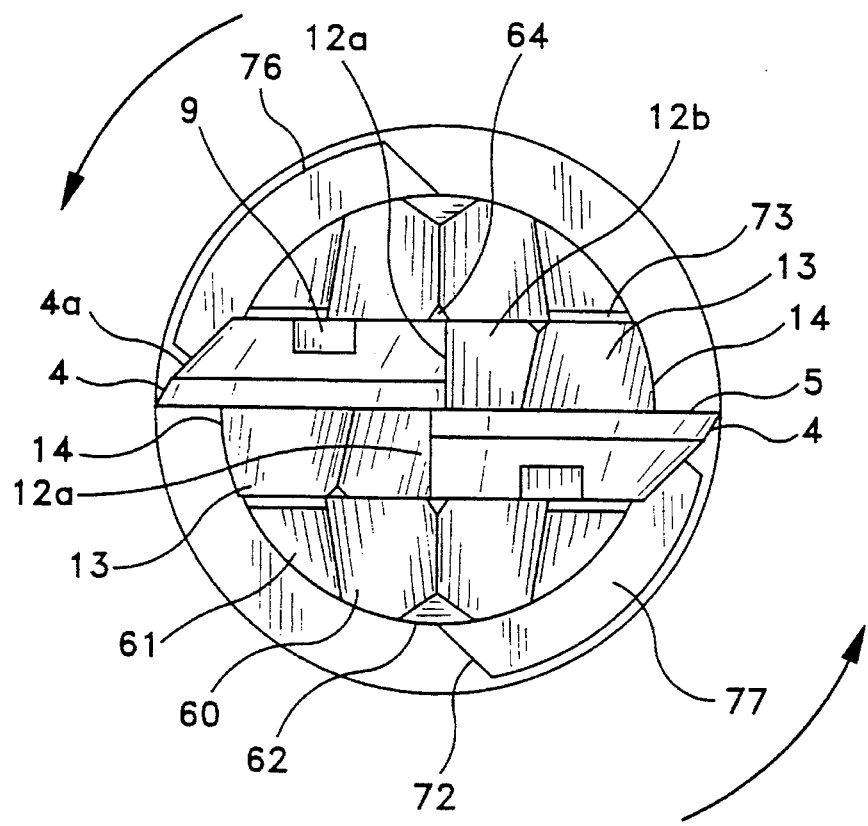
FIG. 4 is a head-on view of the cutting end of the cutting inserts mounted in a forked shank inside a workpiece

Referring now to the drawings, opposite sides of a single cutting insert 1 are shown in FIGS. 1 and 2. The insert may be made from any suitable cutting material, for example, hardened high speed steel, carbide, or ceramic. The cutting head consists of two identical cutting inserts 1 turned face 5 to face 5 to form a common plane and to create a complete cutting head assembly 99 as shown in FIG. 3. The paired cutting inserts are carried in the tines of a forked end 51 forming a head portion 56 of a shank 50, (FIGS. 4, 5 and 6) with an indexing flat 10 on each insert engaging a squared base 57 of the fork to orient or index the cutting faces. The inserts can be made in a wide range of sizes ranging upward from a diameter at least as small as ¼". The inserts have a central through-hole 2, precisely sized, concentric with the outer diameter, and perpendicular to the insert face. The hole is used to accurately and precisely locate the inserts within the fork of shank 50, secured by a clamping screw 52. The insert's center hole may also be used to grind the diameter of the insert to exact size and concentricity. The insert has a dual bevel or land 4 and 4a covering in excess of one quadrant of its circumference to create the cutting edge 3. The primary cutting land 4 is approximately 20°. The secondary land 4a is approximately 30°. This creates additional clearance behind the cutting edge, allows the tool to penetrate the work easier, and is necessary to promote continuous feed of the tool. Since the entire circular portion of the insert is relieved creating a cutting edge, the tool has end mill characteristics and will cut in any lateral direction. The face 5 has a 0° top rake angle, and is flat and parallel to the back surface. Making the cutting tool from two halves facilitates economical manufacture of the insert, which can be surface ground or double disk ground and lapped to gauge accuracy tolerances and finish. This is essential to consistently produce a cutting tool that will achieve an optical finish. Grinding alone is normally adequate to produce a tool capable of optical grade work. However, finish, performance and tool life can be further enhanced if the face 5 and bevel 4 are lapped to a finer microfinish and edge condition. In addition, various surface coatings of the insert may improve performance. An Ovshinsky coating and dicronite are examples.

The flat parallel insert design not only facilitates manufacture, but it will also be seen that when the tool dulls, it may be resharpened by simply laying the part on its back 1 and surface grinding the top face 5. The geometry of the assembled cutting tool (FIG. 5) is circular 3 for approximately 270°. This geometry is important in obtaining an optical finish in the workpiece in any operation. Whether the tool is used in a drilling operation or for machining an external surface, it will be noted that the tool removes most of the material upon partial engagement, but continues to remove material until the diameter of the tool is reached. For example in drilling a hole as shown in FIGS. 7A–D, it can be seen the tool cuts progressively as it advances through the work until the finished diameter is reached at FIG. 7D. As the tool progresses into the work and more of the arc comes into play, less material is actually being removed on the diameter of the hole. In this respect, there is a decreasing depth of cut built into the tool. This is essential for producing an optical finish. This also applies to turning, boring, milling or flycutting operations. The decreasing cut is also responsible for the chip-free cutting actions of the tool. When the tool exits the work, material is always removed progressively, cleaning up the exit hole. As a result, exit holes may be as sharp and clean as entrance holes. The circular form of the tool also contributes to the optical finish in that a radius edge will inherently produce a better microfinish than a V point or other geometries.

Figure 7A:
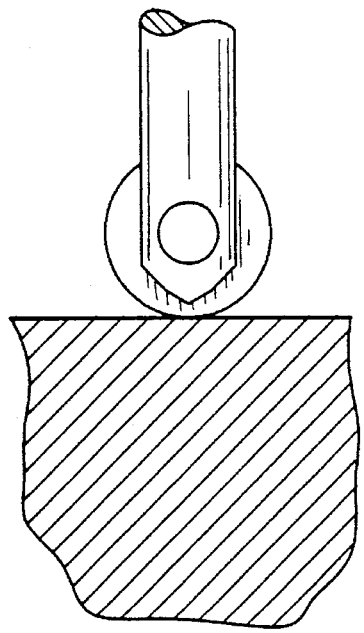
FIGS. 7A, B, C, and D are a representation of the progressive cutting action of a circular tool.
Figure 7B:
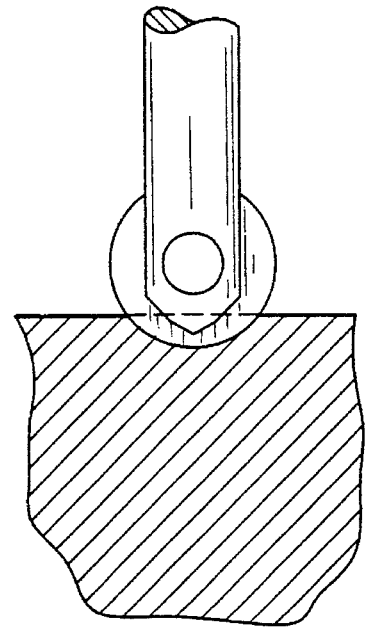
Figure 7C:
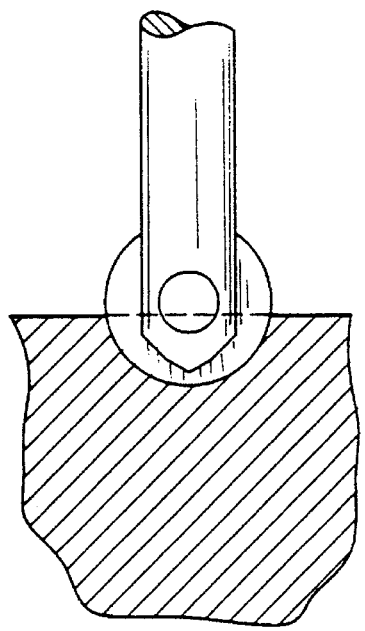
Figure 7D:
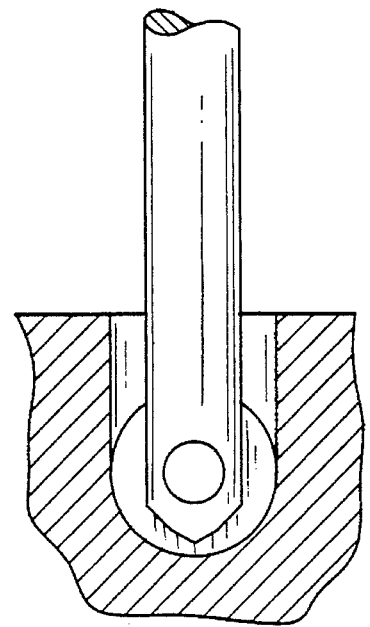

There are only two cutting surfaces presented to the work, minimizing heat generation and the two symmetrical cutting edges balance the cutting forces. All the cutting is finished at the diameter of the cutting insert (FIG. 7D). Because the shank 50 has a smaller diameter, there is no further contact with the machined wall, unlike a conventional twist drill whose flutes will rub on the walls and generate undesirable heat. The ability of the tool to carry away the heat generated in cutting also contributes to the optical finishing ability of the tool. The simple geometry makes it easy and economical to provide through-the-tool cooling to the work as described below.

Figure 5:
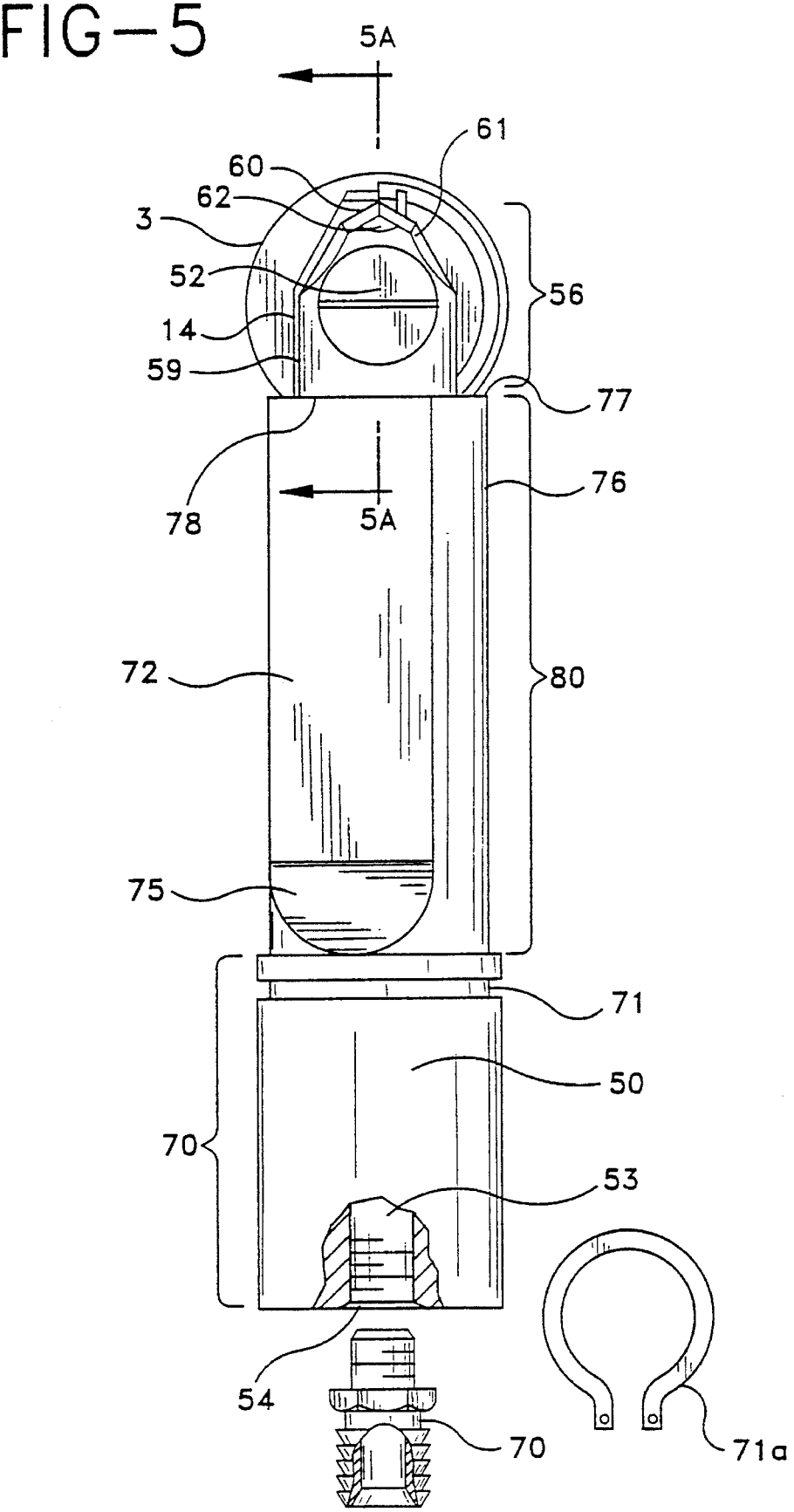
FIG. 5 is a side plan elevation view of an assembled cutting insert and shank.
Figure 5A:
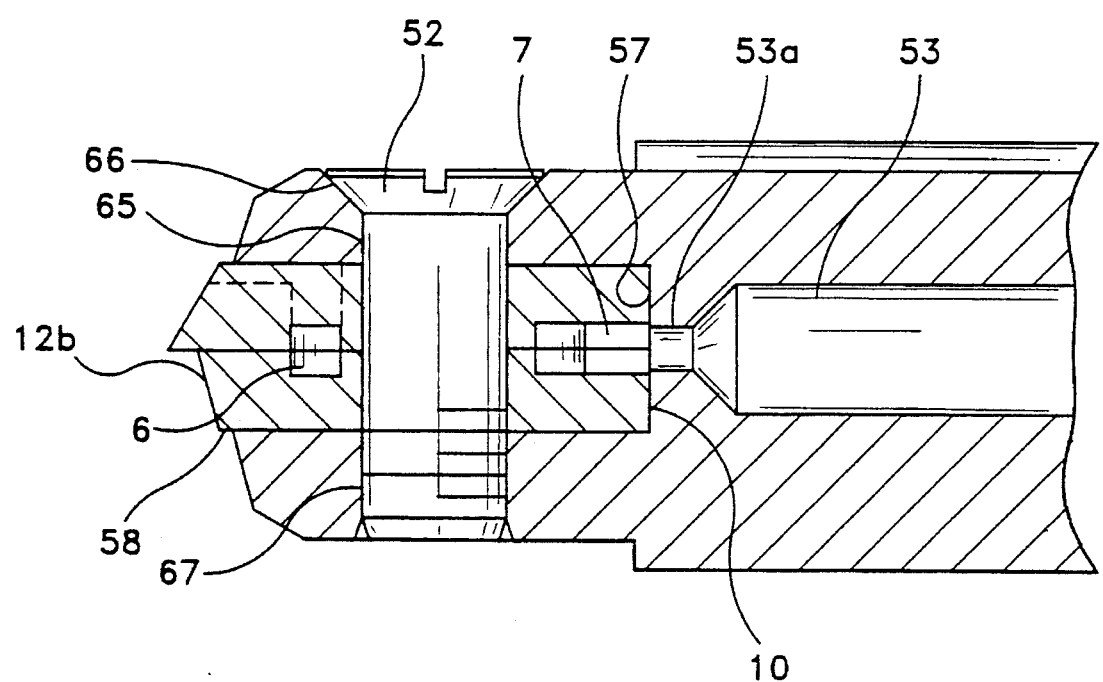
FIG. 5A is a sectional view taken along line 5A—5A in FIG. 5.
Figure 6:
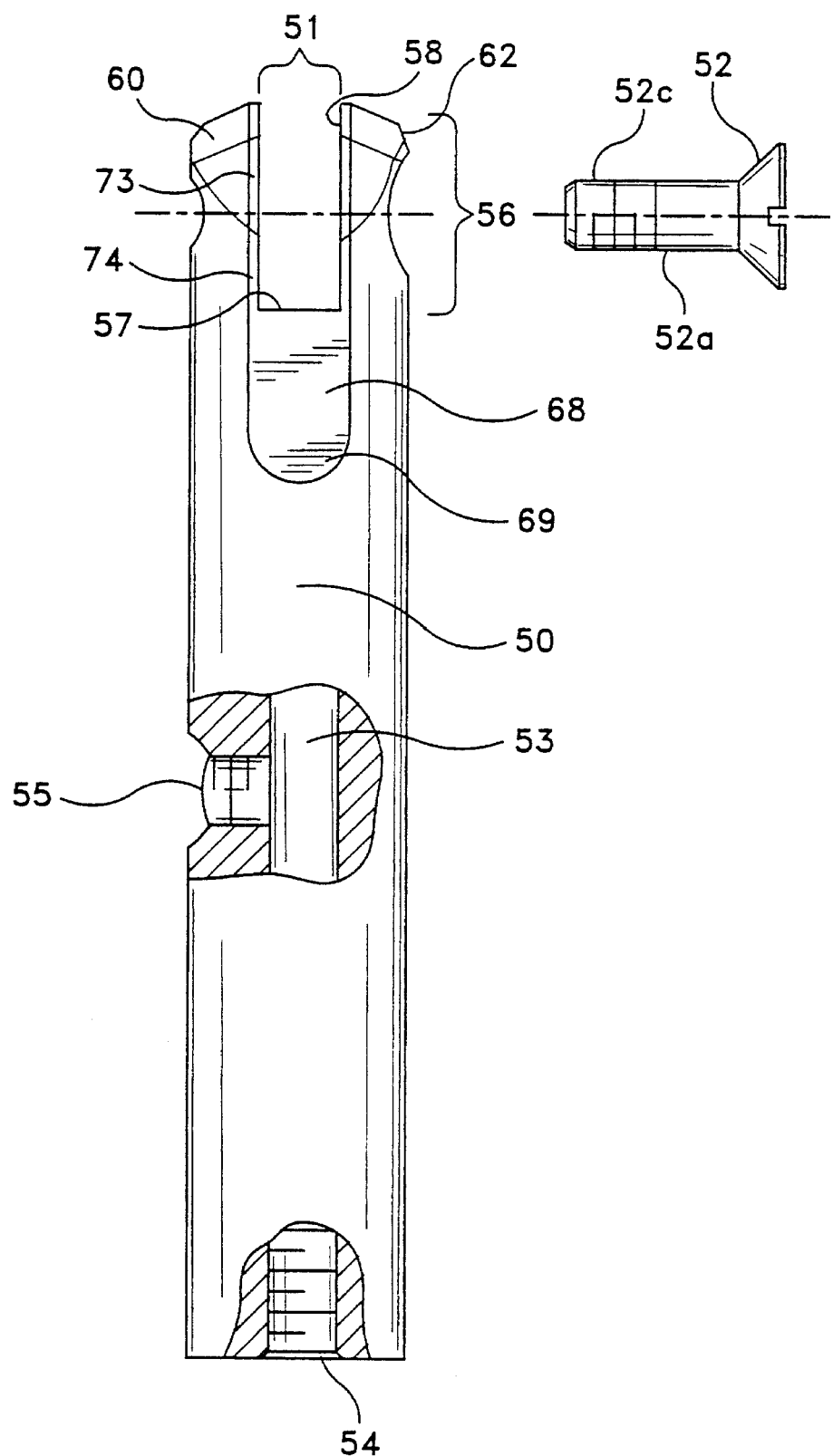
FIG. 6 is a side view of another embodiment of the shank portion of the tool.

Referring to FIGS. 5A and 6, a center through-hole 53 is made in shank 50. The through-hole has a reduced diameter 53A at its junction with the cutting inserts 1. On the back end of shank 50, the through-hole 53 can terminate in screw threads 54 to receive a barbed hose fitting 70 to couple the tool to a coolant source. Also, a port 55 can be cross-drilled and threaded 90° to the shank axis to intersect the through-hole 53. If not used the 55 port can be closed off with a set screw. Integrally formed into the insert 1 is an air ring 6 in the cutting face 5. The outer diameter of air ring 6 is such that it is completely contained within the relieved insert. The air ring 6 allows air to flow through the tool, around center through-hole 2 which is occupied by screw 52. At the base of the insert, an air entrance channel 7 is formed. The cross section of channel 7 and air ring 6 of the assembled inserts is square, as seen in FIG. 3. This shape permits a larger volume of air to pass through the insert than an equivalent round cross section. The corners of the channel may have a slight radius 7a to minimize stress on the part. An aperture 8 smaller than, and contained within air ring 6 is formed in insert 1. An air exit U channel 9 is formed in the back side of insert 1, terminating at the intersection of the through hole 8. Through hole 8 and exit channel 9 may be located anywhere on air ring 6 in the quadrant as indicated in FIG. 2. The exit channel 9 may be directed anywhere from 0°–80°. The arrangement of delivering coolant through the back side of the insert opposite the cutting face effectively makes it impossible to clog these ports as chips are generated, even with excessive feeds or with the air supply shut. The cutting insert 1 with ring 6, entrance and exit channels 7 and 9, and communication hole 8, is ideally suited for mass production by the powder metallurgy process.

Figure 11:
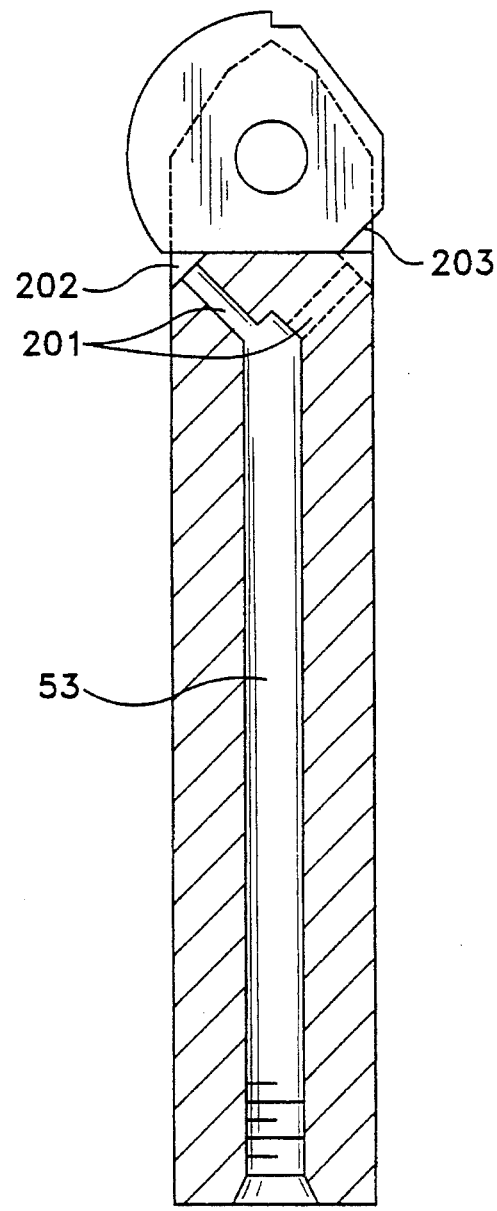
FIG. 11 is a sectional view along lines X—X of FIG. 12.
Figure 12:
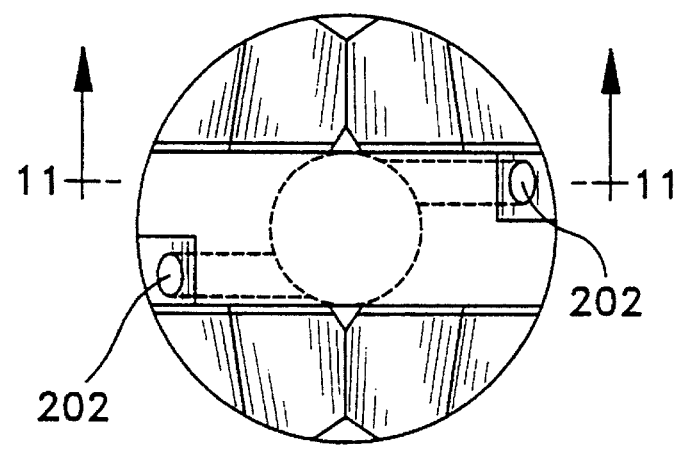
FIG. 12 is a head-on view of the alternate shank embodiment shown in FIG. 11.
Figure 13:
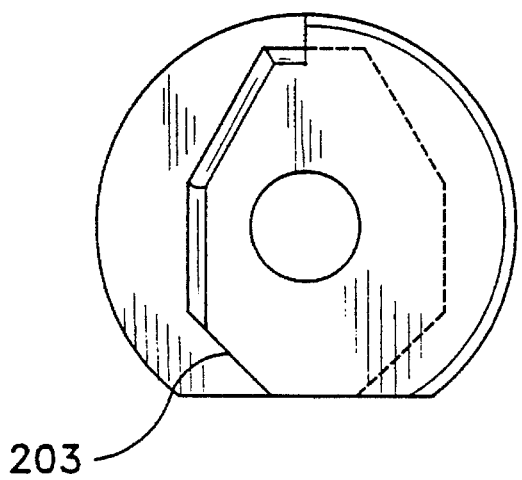
FIG. 13 is a top elevation of an assembled alternate insert embodiment for use with the alternate shank embodiment shown in FIG. 12.

Inserts 1 can also be made without an air ring especially for small sizes. To provide cooling at the cutting edge using non-air inserts, an alternate shank embodiment is necessary, as shown in FIG. 11. The center hole 53 terminates in a Y branch 201. Exit holes 202 are on either side of the centerline of the shank (FIG. 12). In order for the air stream from the Y branch 201 to reach its intended target, flank relief 203 on the insert is necessary. This shank design is suited to milling and boring through-holes.

In the preferred embodiment, air supplied to the tool passes through center hole 53, which is relatively large to accommodate the flow, and through the reduced section 53a which is sized to the diameter of the square air entrance channel 7. The back end of the insert 1 has an indexing flat 10 which abuts against the throat 57 of the fork 51. The air channel 7 is perpendicular to flat 10 and is located on the centerline of the insert. Air enters channel 7, flows around the ring 6, through the communication hole 8, and out the exit channel 9. The head portion 56 of the shank 50 covers the communication hole 8 and focuses the air stream so it exits out the channel which, as shown, is parallel to the axis. In drilling operations, since the hole is blind, air deflects off the forward wall and must exit back out the entrance hole. The air cools both the work and the tool, and aids in flushing out chips. It is essential that the work and tool be kept cool during drilling or other machining operations. This insures the hole size will be very close to the size of the insert. In addition to maintaining a precise dimensional size, cooling also extends tool life.

It will be understood that while air is a preferred cooling medium, any suitable non-reacting coolant may be used, e.g., water-soluble oil. While water-soluble oil is the coolant of choice to consistently produce the most precise, crystal clear, stress-free parts while giving the longest tool life, it is necessary to use a filtration system with recycled coolant as contaminants can clog the fine orifice of the insert and effectively shut off the coolant supply.

The cutting insert 1 has a circular land 11 that separates the air ring 6 from the through-hole 2. This retains the full bearing surface of the through-hole 2 which is used to locate the inserts. Screw 52 (FIG. 6) serves to locate and clamp the assembly. It is a precision screw whose body 52a is sized very closely to thru holes 2 and 65. The body 52a and the inverted conical head 52b, which seats in a mating taper 66, very much resembles a collet in geometry and it serves to accurately and repeatably locate the inserts. The threaded section 52C secures the components. The head the screw 52 may have any suitable driving means, such as a slot or hex cavity. All the parts of the screw 52a, b, c are concentric.

The insert 1 has three distinct cutting face reliefs 12a, 12b, 13 and 14 forming a complex relief geometry performing several functions critical to the invention. The purpose of these reliefs are (i) to expose the cutting face on the opposing insert; (ii) to deflect and expedite the removal of chips as they are formed; and (iii) to create relief on the insert that will not sacrifice the strength of the head portion 56 of shank 50. The center relief 12 is bounded by edges 12a and 12b, the latter being parallel to the indexing flat 10 on the insert 1. The edge 12a is contained in a plane containing the centerline of insert 1. However, in practice this relief can be kept shy of the true centerline so that when the inserts are turned face-to-face, there is a slight overlap of the cutting faces at the axis of the tool. This provides some tolerance of any error between the dimensions of the fork base 57, indexing flat 10, center holes 2, 65, and screw 52. Otherwise, the center relief faces may not close or it may be possible for chips to wedge themselves between the inserts. The center relief 12a is perpendicular to cutting face 5. This helps keep chips in the quadrant in which they are generated. The center relief 12b is inclined or beveled to facilitate the flow of chips. A 20° bevel is preferred. Center relief 12b should be relieved back no further than edge 58 of fork 51. If relief 12b is relieved back too far, an overhanging ledge will be created by the edge 58 of fork 51. This will serve to trap chips, impede the flow of new chips, and cause clogging. Center relief 12b can also be defined by a compound angle. However, results indicate it tends to curl chips which is detrimental to chip ejection, and ultimately to tool penetration.

The relief 13 is formed at an angle between 25° to 45° to the axis of rotation. This angle has a major effect on performance. The angle of optimum performance is 32½°. As this relief 13 functions to deflect chips outward to the periphery of the tool, it has no bevel or only a slight incline. Optimum performance is achieved when the relief 13 is perpendicular to cutting face 5. The extent to which this surface is relieved also has an effect on performance i.e. too little relief causes the chips to choke, not having enough room to escape freely, and too much relief causes performance to deteriorate. A preferred relief is approximately 87% of the insert's diameter as measured across dimension A in FIG. 2.

Figure 8:
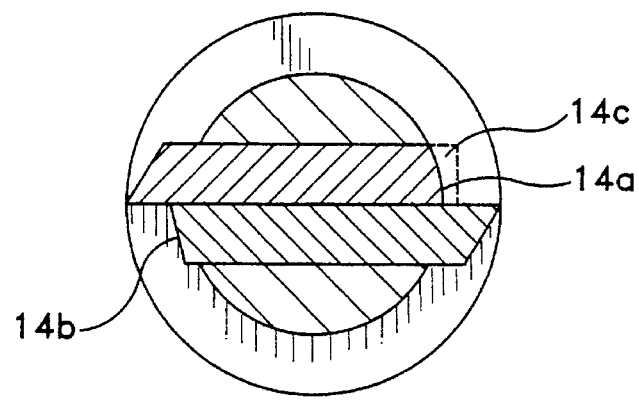
FIG. 8 is a sectional representation showing the clearance created by cylindrical relief.

Side relief 14 is at a 90° angle to the indexing flat 10 and parallel to the axis of rotation. The function of side relief is to get out of the way of exiting chips. Without this relief, the tool will not be able to function as a drill. Virtually any form of relief will work for a milling application, but in drilling, where chips must exit out the entrance hole, the nature of the relief is critical. Without side relief, the tool cannot drill more than its own diameter in depth without "peck" feeding which is inconsistent and time consuming. Side relief 14 is relieved as far back as possible, just shy of the edge 59 of fork 51. As indicated with center relief 12a, 12b, side relief 14 should not be relieved back so far as to have edge 59 overhang the insert 1 as this will create a chip trap that will catch and stop the flow of chips, ruining the hole. The wall defining the side relief 14 is preferably cylindrically rounded as shown at 14 (FIG. 3) or angular in profile as shown at 14b, FIG. 8. This creates clean lines that provide additional clearance for chips to escape, as opposed to a square profile (shown in phantom lines 14c) which would impede chip flow.

As indicated previously, the nature of the composite reliefs 12a, 12b, 13 and 14 on each insert 1 is critical to the performance of the tool, particularly as a drill, the most difficult but important application. The angles of the walls which bound them form with the axis of rotation range from 90° to 0° (ignoring the surface 12a which is itself substantially contained in a plane containing the axis of rotation). A single, linear wall cut as a chord of the circle containing the cutting edge 4 (beginning at the top of the tool) will not yield a functioning drill. There must be a non-linear wall cut on a plurality of angles to the axis of rotation which decrease progressively from the axis throughout at least the first full quadrant of the cutting edge 4. At least two such angles are required and the number can be enlarged to three, as shown in the illustrated embodiment of the invention. It is also possible to form a convex curvilinear wall along at least a portion of the distance necessary to span no less than a full quadrant.

The "aerodynamics" of the overall tool including the shank must be streamlined. The shank head 56 becomes a continuation of the insert's aerodynamics. In keeping with clean aerodynamics, all these surfaces must be deburred, as burrs on the tool will snag chips, impeding flow, and cause clogging.

Multiple facets 60, 61, 62 are made on both halves of the fork 51. Mirror image facet pairs 60, 61 and 62 (FIGS. 4, 5) are made at the ends of both tines 56 of the fork 51 at the outer end of the shank 50. Although the mirror image side is not involved in chip removal, it maintains symmetry and balance, and clears the arc cut by the insert. The center facets 60 of the fork 51 have compound angles. This functions to expatiate chip removal and also to clear the arc cut by the insert at that point. A 20°×20° compound angle works well. The center facet 60 is relieved shy of forming a point in the center. As a result, a small triangular flat 64 is left at the base of the relief. This avoids making the vertex between both sides of the center relief a point, which would be vulnerable to damage in routine handling. The side facets 61 also have compound angles. This serves to facilitate chip removal, cover the communication hole 8 so air will be directed out of air exit channel 9, and to retain strength in the web of the fork. A 30° angle with a 20° bevel is operative. In addition, a slight land or flat 73, (FIG. 6) may be left at the base of the facet. This makes it less subject to handling damage. An additional flat 74 (FIG. 6) may be made on the cylindrical portion of fork 51 for the same reason as flat 73 and also to permit more room for additional side relief clearance 14 on the insert 1, providing extra space for chips in the area of generation. The straight bevel of facet 62 of the fork 51 is necessary for the shank to clear the arc that is cut ahead of it. Otherwise, the shank will rub on the arc and leave an annular score on the hemispherical portion of the hole drilled.

The diameter of the head portion 56 of shank 50 may be up to 75% of the insert's diameter providing substantial support for the insert. A through-hole 65 (FIG. 5A) is made perpendicular to the forked head portion 56 and is located exactly on the centerline of shank 50. This hole is sized the same as the through-hole 2 in the inserts 1. Also located on the top half of fork 51 is a countersunk depression 66 located concentric with the through-hole 65. Shank relief by facets 60 and 61 is shy of the countersink. An internally threaded through hole 67 (FIG. 5A) is formed on the other tine 56. The dimension between the centerline of hole 65 and the base 57 of fork 51 must be closely controlled as must the dimension between through-hole 2 and indexing flat 10 of inserts 1. If the dimension is too small it will not be possible to install the insert in the fork. If too large, an indexing error will occur between the center relief 12a and air can leak out the interface between the shank and the inserts.

Figure 10A:
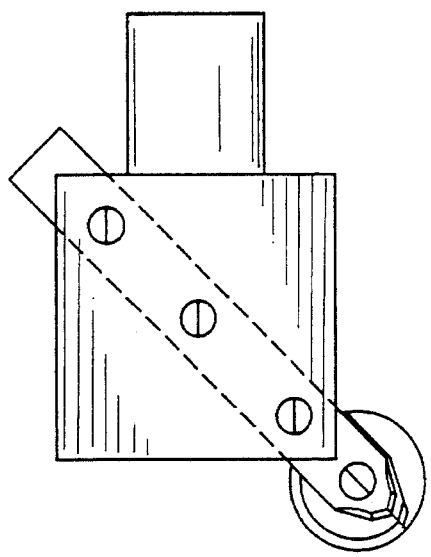
FIGS. 10A and 10B show two means of adapting the tool to flycutting operations.
Figure 10B:
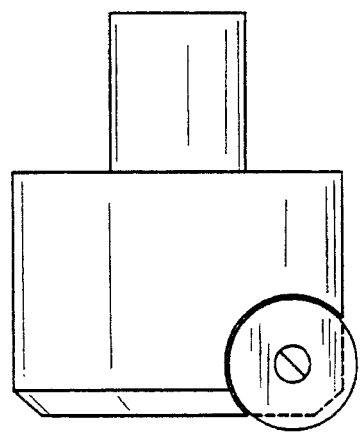

As shown in FIGS. 5 and 6, the shank 50 which holds the inserts 1 may take different forms. The tines of the head portion 56 are identical on both shanks. The shank may be made from steel, hardened steel, or can be carbide brazed to a steel head for rigidity. The straight shank in FIG. 6, has a uniform diameter throughout its length. A flat 68 is milled on either side of the shank for about one diameter in length. The flat 68 terminates in either a radius or an angular surface 69. The flat functions to create additional clearance directly behind the cutting edge. A primary advantage of this shank is its simplicity, which makes it economical to produce. Its uniform diameter means the tool may be chucked deeper, limiting tool extension if necessary, control chatter or facilitate a set-up. The reduced tool extension makes this shank better suited for milling applications. This shank is also more suitable for adapting the tool to a lathe toolholder for facing, turning, boring, or power drilling; or to a boring-head on a milling machine; or for adapting the tool to a fly-cutter FIG. 10A and possibly to a radius turning attachment on the lathe. In these applications, the tool is used effectively as a single-point tool. The straight shank also permits the use of larger inserts with a particular shank so a variety of hole sizes can be drilled with the same shank.

The rear portion 70 of the shank 50 in FIG. 5, is the chucking diameter of the tool. It is a straight, uniform diameter, concentric with the rest of the tool. Its length is sufficiently long so it will create a seal when used with an air/coolant chuck. The diameter of the portion 70 may be larger or smaller than the shank body 80 as well. The portion 70 is concentric to the rest of the tool and is accurately made to certain dimensional sizes, i.e., ⅜", ½", ⅝" etc. This allows the tool to be chucked in the standard collet adaptors of a machine tool. So despite making the drill size in a great variety of sizes, they utilize only a handful of shank diameters 70. This minimizes the number of collet changes that must be made when using different drill sizes. It also minimizes the number of times an elastomer seal adaptor must be changed when the "air chuck" is used. A narrow annular groove 71 formed on the portion 70 is sized to accommodate a snap or C ring 71a. The snap ring functions as a stop so the tool may be repeatably chucked to the same depth in a chuck or collet. It will be seen therefore that if a tool dulls in use and requires replacement, the tool can be removed and the insert replaced without changing either the hole diameter or the depth setting.

Between the chucking portion 70 and the head portion 56 of the shank 50 are a pair of chordal flutes 72. The flute geometry is simple in nature consisting of either two concave or two flat parallel surfaces disposed on opposite sides, making it easy and relatively inexpensive to manufacture. The chordal flute (which can be parallel as shown or concave) does not interfere with, or complicate through-the-tool coolant passage 53, and it creates a substantial amount of clearance necessary for chip ejection, while still maintaining a rigid tool. The chordal flutes also provide the shortest and most direct path for chip ejection. The chordal flutes 72 are at an angle to the fork 51 best seen in FIG. 4. The angle of optimum performance is 45°. The chordal flutes are relieved back far enough to insure clean aerodynamic lines. Insufficient flute relief not only reduces chip clearance capacity, it also leaves a triangular wedge behind the cutting edge which can interfere with chip ejection. The chordal flutes 72 terminate in an angular surface 75. This permits chips to eject freely. The length of the tool from the tip of the insert to the vertex of inclined surface 75 may be up to 4½ times the diameter of the inserts 1.

Figures 9A, 9B:
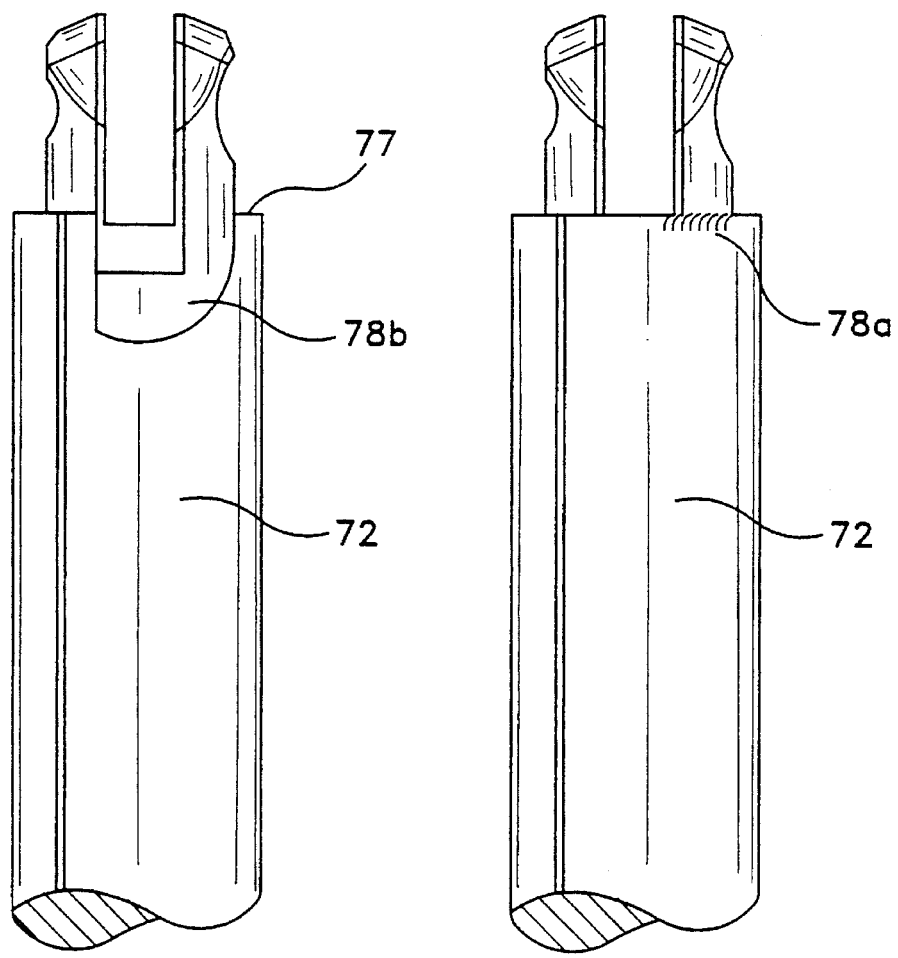
FIGS. 9A and 9B are a side view showing some alternate head/chordal flute junction designs.

The head portion 56 of the shank 50 is approximately 75% of the diameter of the cutting insert 1. The shoulders 77 of the chordal flutes 72 are square so it comes into play earlier than an angular shoulder which would also create a gap which chips must jump. The junction 78 between the head 56 and the chordal flutes 72 may be square as shown in FIG. 5, on a radius 78a (FIG. 9A) or formed as an extended head 78b (FIG. 9B). If made from two-piece brazed construction, or forged construction, the head may extend into the flute without compromising shank aerodynamics. If the head is formed with a radius 78a, the radius is only on the head junction, not on the chordal flutes 72. The cylindrical wedge section 76 between opposing chordal flutes 72 is about 0.010–0.020" or 2.5–5% smaller in diameter than the insert 1 so that the wedge section 76 will be close to but not touch the walls of the hole drilled by insert 1. The close fit of the wedge to the bore serves primarily to keep the chips separated into two distinct chip paths, prevents twisting, and it also makes through-the-tool air more effective as the chordal flutes are essentially the only path out. The wedge maintains rigidity, keeps chips from going over the top, twisting into a tight curl and breaking as occurs with the straight shank. Once the chip breaks and its connection with the generating chip is severed, there is no longer any motive force acting on the chip to expel it. As a result, the chip would be caught as in a revolving door. Air pressure alone is usually not adequate to remove such a chip, especially if the chip has wrapped around the shank to cause clogging. The chordal flute shank is effective in preventing this, and readily directs chips out and, as a result, is better suited to drilling holes. The drill has the ability to drill to a depth of 4 times the insert diameter on through-holes, or 4½–5 times the insert diameter on blind holes, whether the tool is used in the lathe where the tool is "dead" or in the milling machine where the tool rotates, using either air or water-soluble coolant. Also, it can penetrate to these depths using continuous power feed. The tool can also drill using manual continuous feed. Optically finished, precisely sized, stress-free holes are thus accomplished in a single pass of the tool. The straight shank, while more versatile, cannot penetrate to four diameters deep, if at all, without resorting to inconsistent, undesirable peck-feeding. Its penetrating ability increases with oversize inserts which create additional chip clearance. The chordal shanks, however, cannot accommodate the range of insert diameters that the straight shank can handle. While the chordal shank can handle inserts with a size variation of about 2%, the straight shank can handle a variation of between 10% and 25%.

Since the shank and circular insert combination is primarily designed for acrylics and like materials, rotary speed and axial feed rates can be prescribed for a given size tool and a cutting speed value can be assigned to the material so that the proper RPM can be calculated for any size tool using the formula RPM=Cutting speed×4/tool diameter. An empirical value of 50–75 may be assigned as the cutting speed for acrylic with this tool. The tool gives optimal performance at relatively slow RPM as less heat is generated at lower RPM and because at higher speeds, more tool deflection occurs inducing chatter and a poor finish. A ½" tool works best at 400–600 RPM, and while a variety of feed rates may be used, a 0.003"/revolution rate is a good general purpose starting point.

Figure 14:
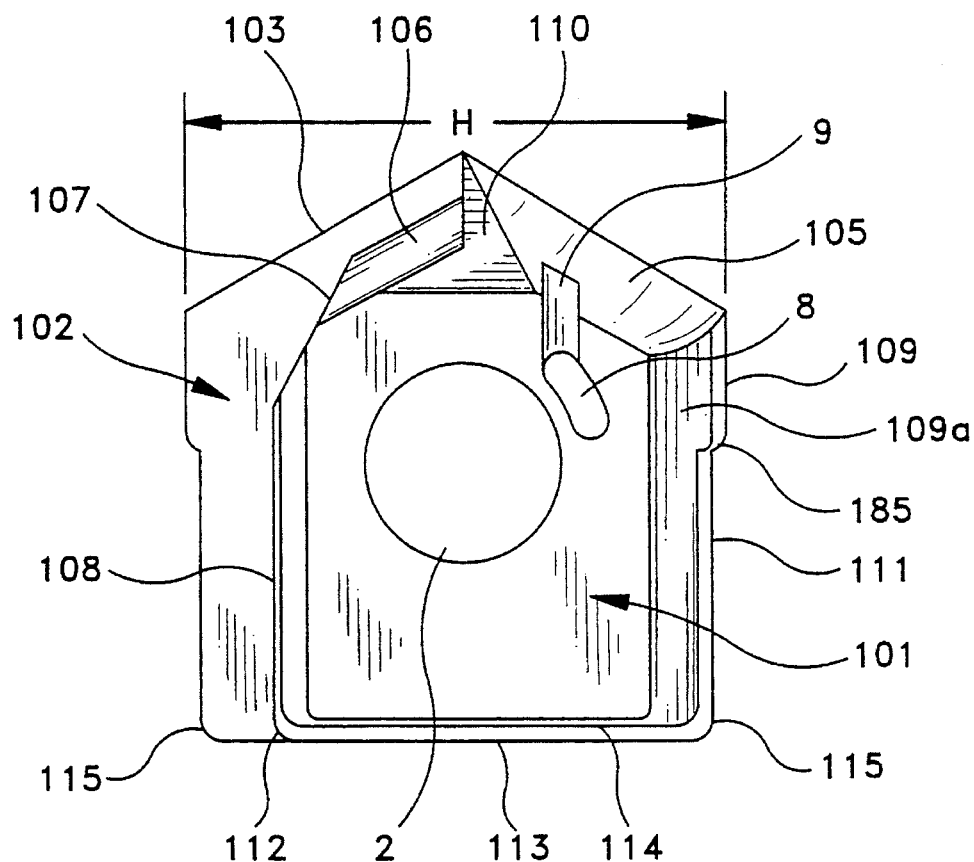
FIG. 14 is a plan elevation view of an assembled conical insert.

As described above, either the simple shank or the chordal flute shank may accommodate inserts with different profiles. Thus, the range of materials that can be drilled with this tool is greatly increased to include other plastics, non-metallic materials and non-ferrous sheet metals. One such insert is a conical cutting assembly 100 (FIGS. 14 and 15) comprising two identical cutting inserts 101 mated face 102 to face 102 as in the case of the circular inserts described above. They are also clamped in the forked end 51 of either of the shanks 50 FIG. 5 and 6. Its geometry can reproduce the profile produced with conventional twist drills. The illustrated insert is suited to drilling polycarbonate plastic, producing optical finishes, accurate size and virtually burr free holes in this material.

The cutting face angle can be shallow, 118–160 degrees included angle, thus less depth is needed to produce the full cylindrical profile in the work. In addition, the cutting point can be renewed several times, once dull, by grinding the point back, without changing the diameter H (FIG. 14), unlike the circular inserts described above. The conical cutting insert, therefore, has longer tool life and resharpening can be carried out using drill sharpening equipment with the inserts assembled in the simple shank. Also, the size can be readily changed by grinding the O.D., or the face 102 of the insert.

Figure 15:
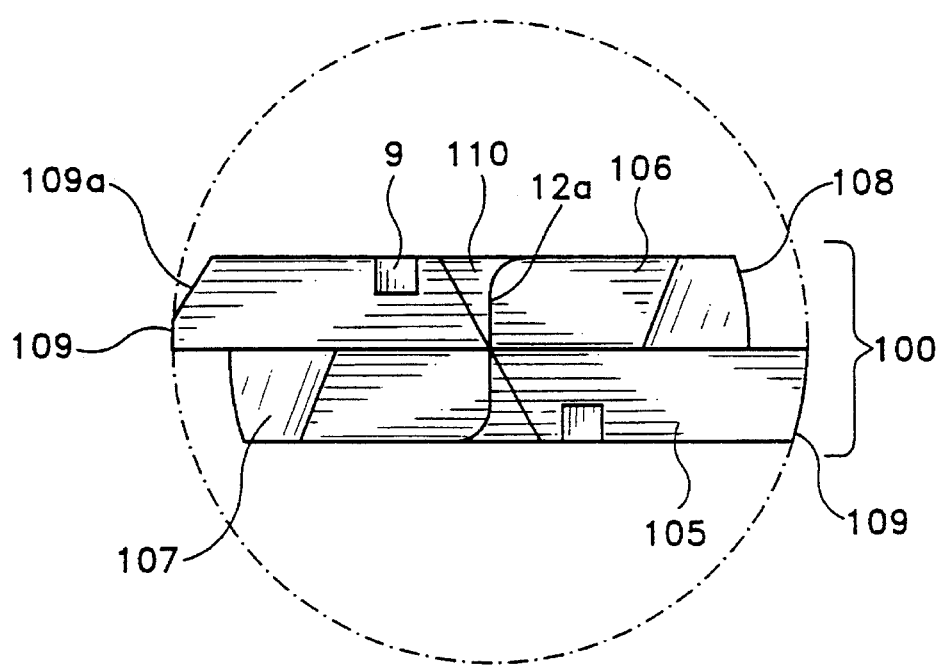
FIG. 15 is a head on view of the assembled conical insert shown in FIG. 14.

Cutting with this insert takes place on the conical edge 103 only. This edge may be angularly, radially, or helically relieved 105 as is the point on a conventional twist drill. The cutting face 102 is exposed by relieving the opposing face of the mating insert. This relief 106 is preferably a compound angle (essentially parallel with the cutting edge and having a 20° bevel). The bevel is important for chip removal. Additionally, the face also has angular relief 107 (typically 30×0 degree bevel) to assist in directing chips. The face is relieved further by side relief 108 which is angularly or cylindrically ground whose function is to clear a path for exiting chips. These three reliefs, while typically in different proportions, exist on the above described circular inserts as well, to insure the removal of chips. The straight side edge 109 of the insert 101 is cylindrically ground as best seen in FIG. 15. (For purposes of illustration one side is depicted without relief of the radial edge). This assists in guiding the tool in the work to produce accurate holes. This radially ground margin prevents the use of this insert for milling operations as the radially ground edge will not cut. The radially ground edge 109 may produce some burnishing action in the work, giving better finishes. To reduce the area contacting the walls of the work and to prevent burning, side radial edge 109 can have radial angular relief 109a. Margin and relief may be produced in the same proportions as the dual cutting edge 4, 4a of the circular insert of FIG. 3. In the same respect, the sides 109 of the insert may be reduced in length by undercutting a portion of the side edge to produce a land of a reduced diameter 111. The diameter should be reduced by 0.005" or 0.010" or enough to clear the drilled hole, but not enough to catch chips and cause clogging. In addition to reducing friction by reducing the area in contact with the work, the undercut is also beneficial in that it minimizes the effect of indexing error. With rectilinear inserts, an indexing error will cause the sides 109 of the insert to assume a position that is not parallel with the axis of the shank. The resultant taper produces inaccurate hole sizes. The longer the tapered surface the greater the error. The inserts 101, like the circular inserts or any other inserts for this tool, can have an air ring for through-the-tool cooling as described previously to aid in chip removal. The coolant ring is identical to that of the circular insert.

The preferred point angle for drilling through-holes in polycarbonate is a 160° included angle. This produces a clean exit hole. When a 118° included angle point is utilized it is necessary to grind a 40°–45° bevel 110 on the back side of the insert or the insert will not clear the cone to be cut. Alternatively, the cone may have a cutting flat (0°×20° bevel) or near flat at its foremost edge instead of a point (vertex) as it eliminates the need for back beveling. With the 160° point angle this is unnecessary and is a definite advantage when resharpening is required.

On the bottom portion of the inserts 101 a compound radius 112, 115 can be formed on all the corners. The purpose of his is to preserve the fork base 57 (FIG. 6) from damage that can occur from the corners of the inserts gouging the shank if difficulty should be encountered in installing or removing inserts from the shank. A compound radius 185 can also be formed at the base of side edge 109, to avoid possible damage to the walls of the hole on tool retraction. Additionally, the intersection between the back face of the insert and indexing flat 113 may also include a slight radius or chamfer 114. This insures the inserts will still seat properly on the fork base, if the fork is not produced with absolutely square corners. The high precision required to produce negligible indexing error will likely require grinding the fork. Maintaining a sharp corner by grinding is difficult. The chamfer 114 makes a sharp corner unnecessary. It will be understood that the indexing flat 113 and the chamfer 114 can be replaced by a single radius, with the base of the fork having a matching radius.

While the invention described above has reference to preferred embodiments, it will be understood that it can take other forms and arrangements within the scope of the invention which should not, therefore, be regarded as limited except as delivered in the following claims.

I claim:

1. A rotary cutting tool for machining and drilling holes in plastic materials including acrylics, polycarbonates and materials having like characteristics to impart optical finishes and precision dimensions, comprising:

a rotary shank;

a cutting head carried by the shank and having two complementary cutting portions having a common plane passing through the axis of rotation and disposed on opposite sides of said plane;

one of said portions having a cutting edge contained in said plane and extending at least 90 degrees from a point adjacent the axis of rotation;

the other of said portions having a cutting edge contained in said plane and extending from the said point on the axis of rotation in the opposite direction from the cutting edge of the first portion at least 90° from said point;

each of said cutting portions being relieved of material to define a relief exposing the cutting edge of the other, with the respective reliefs extending in opposite directions from said point on the axis of rotation at least 90° therefrom and cut substantially to the depth of the common plane between the two portions;

each of the reliefs being defined by a non-linear wall beginning at the axis of rotation and forming at least two different angles to the axis of rotation, with the steeper angle being disposed closer to the axis.

2. A cutting tool as set forth in claim 1, at least a portion of the non-linear wall being inclined to the common plane at an angle less than 90°.

3. A cutting tool as set forth in claim 1, the non-linear wall having at least three substantially linear sections, with the section closest to the axis of rotation being substantially parallel to the proximate cutting edge and spaced axially therefrom, and with a section remote from the axis of rotation being substantially parallel to the axis of rotation.

4. A cutting tool as set forth in claim 3, said remote relief section wall forming an angle less than 90° to said common plane.

5. A cutting tool as set forth in claim 1, the cutting edges being circular and extending not less than 90° from the axis of rotation.

6. A cutting tool as set forth in claim 1, said cutting edges being substantially linear and inclined to the axis of rotation.

7. A cutting tool as set forth in claim 1, each of said cutting portions having parallel side walls, each portion comprising a separate detachable insert of identical geometry and adapted to be mounted in reverse face to face assembly in which the mated faces are in said common plane.

8. A cutting tool as set forth in claim 7, including a rotary shank to carry the cutting portions, said shank including a forked end, the tines of which embrace the mated cutting portion.

9. A cutting tool as set forth in claim 8 including duct means in the shank to carry coolant fluid to the cutting head.

10. A cutting tool as set forth in claim 9 including coolant duct means in the cutting portions to receive coolant fluid from the shank and to discharge the fluid adjacent the respective cutting edge.

11. A cutting tool as set forth in claim 10, said duct means in the cutting portions being disposed both at the said common plane and on the outer surfaces embraced by said forked end of the shank, and transverse duct means in each cutting portion joining the duct means on the outer surface to the duct means at the common plane.

12. A cutting tool as set forth in claim 8, an indexing surface at the base of forked end and mating surfaces on the complementary cutting positions to position the cutting head in the shank.

13. A cutting tool as set forth in claim 8, said shank being cylindrical and formed with elongated chordal flutes on the side wall extending rearwardly from the forked end to provide passages for the flow of chips rearward from the cutting head.

14. A cutting tool as set forth in claim 13, said flutes being formed at angles to the said common plane of the cutting head.

15. A cutting tool as set forth in claim 10, said duct means in the shank including an axial duct and a transverse duct adjacent the forked end connecting the axial duct to the duct means of the cutting portions.

16. A cutting tool as set forth in claim 8, the outer ends of the tines of the forked end being formed with multiple facets at angles to the axis of rotation to direct the flow of chips cut by the tool.

17. A cutting tool as set forth in claim 8, including a central hole through the cutting portions and aligned holes in the tines of the forked end, and a securing screw passing through the holes to anchor the cutting head in the shank.

18. A cutting tool as set forth in claim 14, said chordal flutes in the shank being at an angle of approximately 45° to the said common plane to communicate respectively to the respective cutting edges of the two cutting portions.

19. A cutting tool as set forth in claim 7, wherein the outer side walls include a first portion that substantially matches a circle traced by rotation of the tool insert and a second portion being inclined at an angle to the inscribed circle to form a clearance angle.

20. A cutting tool as set forth in claim 19, wherein the insert includes a bevel to create a cutting edge along a top edge inclined to the axis.

21. A cutting tool for precision machining or drilling holes in materials comprising:

a shank, the shank including a forked head;

a cutting insert carried by the forked head; and coolant duct means, said coolant duct means including an axial bore through the shank, the shank including an exit opening of the axial bore at a throat of the forked head, the cutting insert including a coolant channel integrally formed in the insert forming a ring around a through hole of the insert, said channel having an entrance opening at the base of the insert communicating with the exit opening at the throat of the forked head of the shank, the insert further including an exit channel communicating with the coolant channel, the exit channel being positioned on a back face of the insert opposite a cutting quadrant to thereby prevent clogging of the coolant duct means.

* * * * *